United States Patent [19]

Peleg

[11] Patent Number: 5,197,238
[45] Date of Patent: Mar. 30, 1993

[54] ENCLOSED STRUCTURES

[76] Inventor: Alexander Peleg, Moshav Betzaron, Israel

[21] Appl. No.: 627,522

[22] Filed: Dec. 14, 1990

Related U.S. Application Data

[63] Continuation-in-part of Ser. No. 537,666, Jun. 1, 1990, abandoned.

[30] Foreign Application Priority Data

Jun. 15, 1989 [IL] Israel ........................ 90627

[51] Int. Cl.$^5$ .............................................. E04D 13/00
[52] U.S. Cl. ........................................ 52/13; 52/15; 52/63; 52/222; 47/17
[58] Field of Search .................. 52/63, 222, 11, 13, 52/15; 47/17, 28.1, 29

[56] References Cited

U.S. PATENT DOCUMENTS

| | | | |
|---|---|---|---|
| 758,033 | 4/1904 | Holmes | 52/63 |
| 2,832,362 | 4/1958 | Critoph | 52/63 |
| 2,910,994 | 11/1959 | Joy . | |
| 2,996,729 | 8/1961 | Bailey . | |
| 3,719,013 | 3/1973 | Blick | 52/63 X |
| 3,719,341 | 3/1973 | Harrington | 52/222 X |
| 3,765,134 | 10/1973 | Gilchrist . | |
| 3,911,632 | 10/1975 | Bryfogle et al. | 52/63 X |
| 3,925,942 | 12/1975 | Hemmelsbach . | |
| 4,083,157 | 4/1978 | Anthonioz | 52/222 |
| 4,117,636 | 10/1978 | Smith | 52/13 |
| 4,173,101 | 11/1979 | Van Wingerden | 52/13 |
| 4,313,279 | 2/1982 | Greenbaum . | |
| 4,387,533 | 6/1983 | Green et al. | 52/63 X |
| 4,502,256 | 3/1985 | Hahn | 52/63 |
| 4,566,236 | 1/1986 | Pound | 52/222 |
| 4,571,897 | 2/1986 | Kerr | 52/222 X |
| 4,665,670 | 5/1987 | van den Burg | 52/222 |
| 4,694,543 | 9/1987 | Conley | 52/63 |
| 4,763,452 | 8/1988 | Harvey | 52/222 X |
| 4,769,877 | 9/1988 | Conley | 52/222 X |
| 4,837,990 | 6/1989 | Peleg | 52/63 |
| 4,887,626 | 12/1989 | Dalo et al. | 52/222 X |

FOREIGN PATENT DOCUMENTS

1479336 3/1967 France .
1447043 8/1976 United Kingdom .
1498945 1/1978 United Kingdom .

Primary Examiner—Richard E. Chilcot, Jr.
Assistant Examiner—Robert Canfield
Attorney, Agent, or Firm—Browdy and Neimark

[57] ABSTRACT

This invention is directed to a plastic-covered, gutter-connected sheltering horticultural structure constructed of a framework and flexible cover sheet material. The structure is constructed with a number of gutters with arched roof trusses connected at their ends between side walls of a consecutive pair of the gutters. Anchor means are provided to join each of the gutters for engagement to longitudinal edges of flexible covering sheet material and maintaining the sheet material in a tensioned state over the roof trusses. A plurality of fastening means are spaced at intervals along the length of the gutters to maintain the anchor means spaced apart from the gutters to provide unobstructed passages between the anchor means and the gutters. This permits condensation fluids generated within the structure to travel down the underside of the flexible covering sheet material, over the anchor means, through the unobstructed passages into the gutters and fluid precipitation generated exterior to the structure to fall on the flexible covering sheet material and to travel down directly into the gutters.

3 Claims, 6 Drawing Sheets

FIG. 13

ENCLOSED STRUCTURES

BACKGROUND OF THE INVENTION

This is a continuation-in-part of application Ser. No. 07/537,666 filed on Jun. 1, 1990, and now abandoned.

The present invention relates to an enclosed structure. More particularly, it relates to a structure providing for the guttering of internally generated condensation fluids in greenhouses and for extending the life of the roof covering sheet material.

Many different structures have been proposed, such as are described in U.S. Pat. Nos. 2,910,994; 3,765,134; 3,911,632; 3,925,942; 4,117,636; 4,173,101 and 4,313,279; British Patent Nos. 1,416,993; 1,447,043; 1,498,945; French Patent No. 1,479,336 and many others. Most of these structures are intended for use as greenhouses, while some are intended as storage sheds or swimming pools (U.S. Pat. No. 2,996,729). The provision of guttering for the drainage of rain has been given attention. However, in certain types of greenhouses and in structures used for storage, fluids condensing on the internal side of the roof sheeting should not be allowed to drip onto the supporting structure between roof spans, as this results in undesirably high humidity which induces corrosion of such supports and facilitates the spread of plant diseases in greenhouses. Furthermore, the dripping of fluids onto persons passing along the inner sides of such enclosures is highly aggravating and should be avoided. Surprisingly, almost no attention has been given to this problem in the prior art, possibly because of the difficulty of providing such drainage without thereby allowing the escape of substantial quantities of warm air.

It is therefore one of the objects of the present invention to obviate the disadvantages of the prior art enclosed structures and to provide a structure which allows for the collection of condensation fluids in the same guttering means provided for rain drainage.

A further object is to provide a structure having an easily assembled and retensionable roof cover.

Yet a further object is to provide such a structure allowing for the secure anchorage of the roof cover, thereby extending the life of the roof cover sheeting material beyond a single season.

A last object is to provide such a structure provided with a ventilation aperture which may be conveniently opened or closed and yet retain the advantage of condensation fluid drainage.

BRIEF DESCRIPTION OF THE INVENTION

This the present invention achieves by providing a plastic-covered, gutter-connected sheltering horticultural structure, essentially constructed of a framework and flexible cover sheet material, comprising at least two frames located side by side as a double or multi-span protective structure, each frame defining a span and including roof members and attached longitudinal side frame members of adjacent spans, gutter means associated with said side frame members and interconnecting side by side frames, said gutter means being constituted by a bottom wall and two side walls forming a channel delimiting a space therebetween, and flexible covering sheet material covering a roof span, said structure further comprising means for the guttering of internally-generated condensation fluids, characterized in that the longitudinal edges of said sheet material are respectively affixed to anchor means, said anchor means extending along an inner surface of said gutter means and being affixed thereto to maintain said flexible covering means in a tensioned state, the line of first contact between said flexible covering means and said anchor means being located in said delimited space or thereabove, whereby said condensation fluids dripping from the underside of said flexible covering means are drained by said gutter means.

In preferred embodiments of the present invention, said anchor means are located in said delimited space or thereabove, whereby said condensation fluids from the underside of said flexible covering means pass along the surfaces of said anchor means and drip therefrom onto said inner surface of said gutter means.

In U.S. Pat. No. 4,173,101 there is described and claimed a greenhouse gutter assembly including an extruded channel member having a horizontal drainage bottom and upper side members projecting upwardly therefrom. A flange extends across the upper end of the channel member and includes an inwardly projecting leg which serves to support the plastic roof material and a pair of diverging legs which are accommodated within a slot carried within a bracket which has a portion for extending inwardly of the tubular bow member as a support thereof. While said assembly bears resemblance to the assembly of the present invention, it can be realized and seen that the inner surface of the plastic roof material spread between the spaced bow members comes in contact with the projecting legs of the flange and thus condensation fluids will accumulate at this contact line and drip into the greenhouse, as opposed to dripping into the gutter as provided for by the present invention.

The invention also provides for a strong gutter channel as well as convenient means to tension, retension and replace the roof sheeting material as required.

In a further preferred embodiment of the present invention there is provided an arrangement for the opening and closing of a ventilation aperture along at least part of the length of the roof and for the retraction and rolled storage of a lower part of the roof sheeting without necessitating its removal from the structure. More particularly, in this embodiment there is provided a plastic-covered, gutter-connected ventilated horticultural structure, essentially constructed of a framework, fixed upper flexible cover sheet material and rollable retractable lower flexible sheet material, and including roof members, upper and lower gutter means associated with said roof members, said upper gutter means comprising two side walls delimiting a space therebetween, said fixed upper flexible cover sheet material covering a roof span, said structure further comprising means for the guttering of internally-generated condensation fluids, characterised in that the longitudinal edges of said sheet materials are respectively affixed to upper and lower anchor means, said upper anchor means extending along an inner surface of said upper gutter means and being affixed thereto to maintain said flexible covering means in a tensioned state, the line of first contact between said flexible covering means and said anchor means being located in said delimited space or thereabove, whereby said condensation fluids dripping from the underside of said flexible covering means are received by said upper gutter means and subsequently by said lower gutter means, and whereby said rollable retractable lower flexible sheet material serves for the opening and closing of a ventilation aperture along at least part of the length of the structure.

BRIEF DESCRIPTION OF THE DRAWINGS

The invention will now be described in connection with certain preferred embodiments, with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENT

Figure 1:
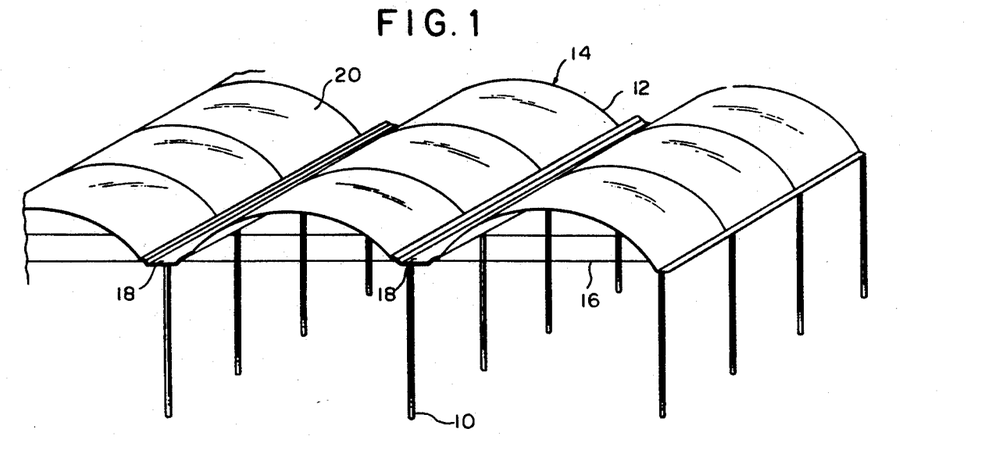
FIG. 1 is a general perspective view without details, of a structure according to the invention.

There is seen in FIG. 1 a general view of a sheltering horticultural structure supported on a framework 10. A plurality of roof members 12 form roof spans 14 of arches or pitted shape, the roof members 12 being stabilized by tie rods 16. Side-by-side roof spans are connected and supported by gutter means 18. End walls, pillar foundations, the methods of attaching the roof members 12 to the gutter means 18 and various strengthening strusses are omitted or not detailed, these being known in the prior art and not forming part of the present invention.

Roof spans 14 are formed as a flexible cover sheet material 20 which is tensioned over the roof members 12 by means which will be described. The sheet material 20 is made of a transparent, flexible plastic film preferably with an UV stabilizer added to ensure that the film is usable for at least one growing season. Suitable materials include engineering plastics such as polyethylene, polyester, polypropylene and polycarbonate.

Figure 2:
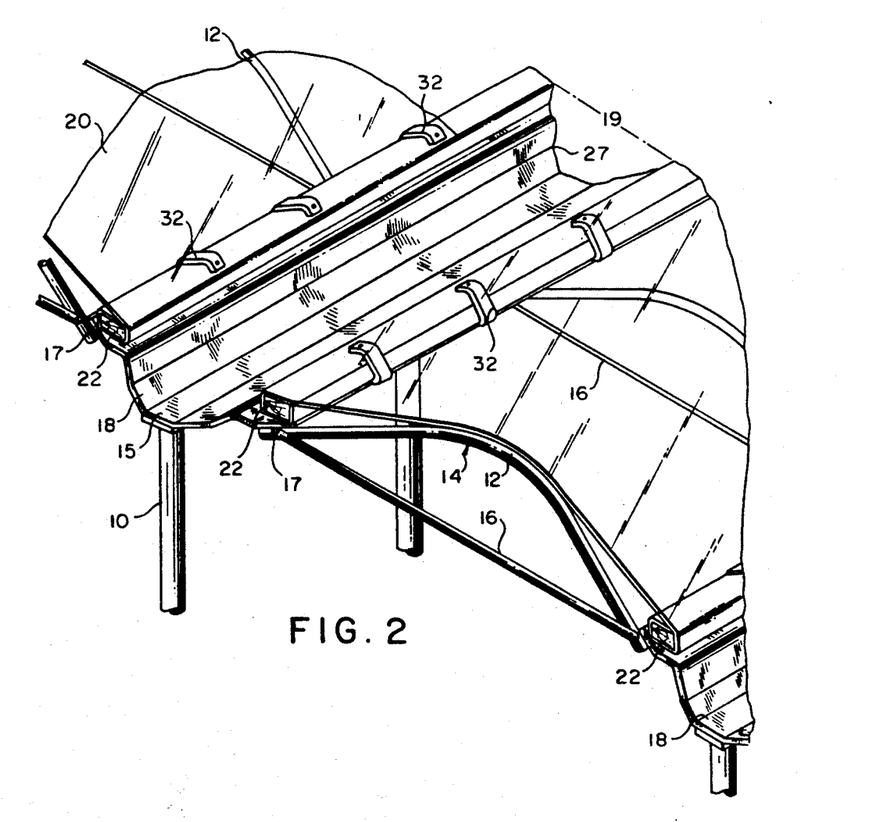
FIG. 2 is a perspective view of the preferred embodiment of the guttering means and roof sheeting attachments.
Figures 3, 3A:
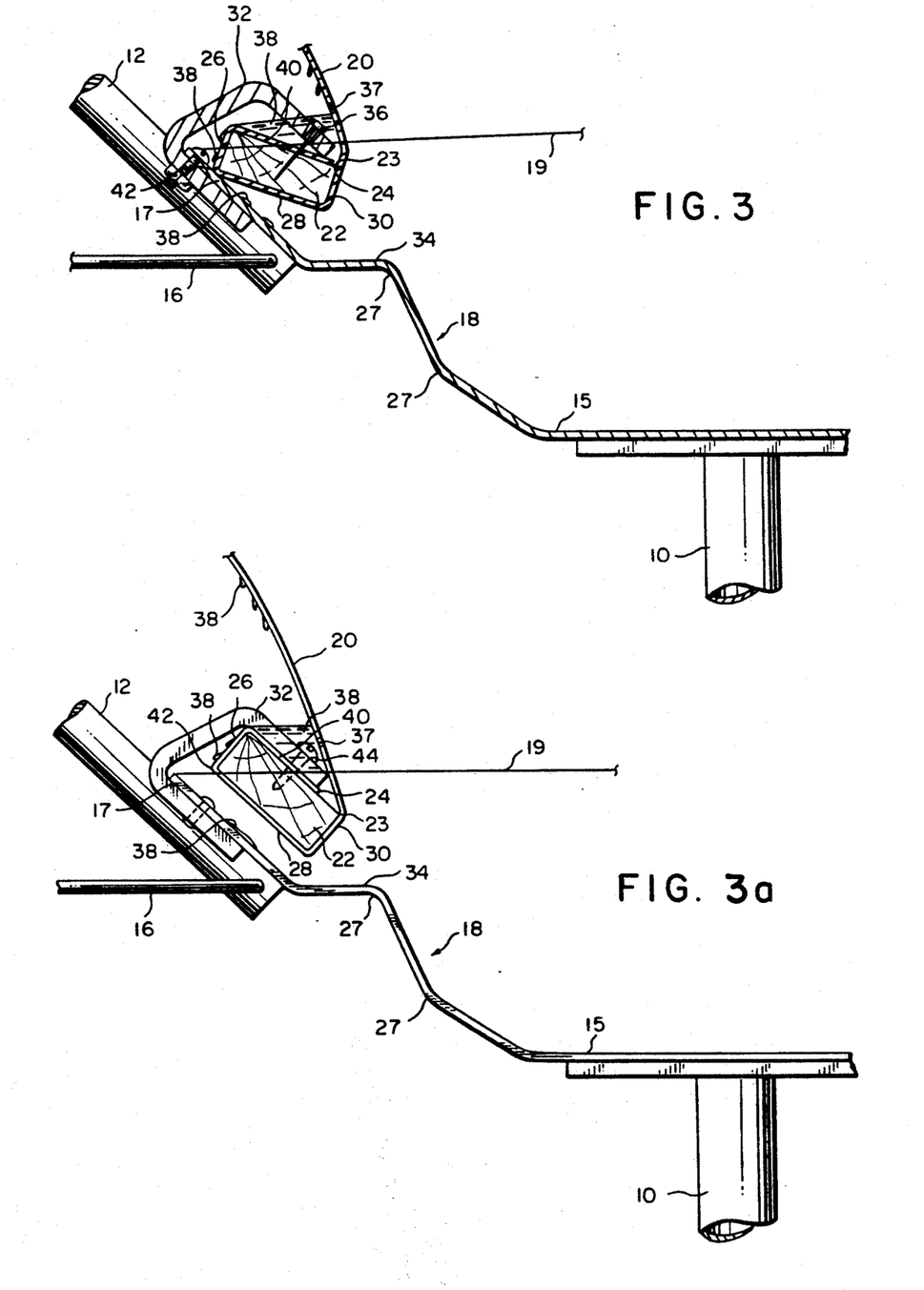
FIG. 3 is a fragmented end view showing further details of the embodiment of FIG. 2.
FIG. 3a is an end view of an additional embodiment of that shown in FIG. 3.

Referring now to FIGS. 2 and 3, gutter means 18 have the general form in cross-section of a flat-bottomed vee, constituted by a bottom wall 15 and two side walls 17 forming a channel delimiting a space 19 therebetween. The side walls 17 preferably include several secondary bends 27 providing additional rigidity and enabling it to carry its loads without necessitating the use of thick sheet steel in its construction. It can conveniently be manufactured by roll-forming a galvanized steel strip.

An anchor means 22 retains one longitudinal edge 24 of the sheet material 20 which is wrapped at least around the inner side surface 26, the bottom surface 28 and the outer side surface 30 of the anchor means 22, this wrap-around enabling the anchor means 22 to exert a firm grip on the sheet material 20 for the purpose of tensioning. This method avoids local stress concentrations on the sheet material 20, and its useful life is thereby extended, typically for at least one growing season.

It is to be noted that the first line of contact 23 between the sheet material 20 forming the flexible covering means and the anchor means 22 is located in said delimited space 19 or thereabove, whereby condensation fluids dripping from the underside of said flexible covering sheet 20 fall onto a fluid-receiving upper portion 34 of gutter means 18.

Optionally, extra gripping security may be provided by inserting a nail 36 through the clamping member 32. A small puncture 37 is thereby formed in the sheet material, but experience has shown that there is no noticeable detrimental effect therefrom.

The anchor means 22 is preferably held by means of clamping members 32 within said delimited space 19 or thereabove, and thereby is also above a fluid-receiving upper portion 34 of the gutter means 18. The anchor means 22 shown in this embodiment is made of timber and is of rectangular cross-section. In further embodiments, a trapezoid timber section, or a rectangular section steel tube (not shown) are used.

Experience has shown that the clamping members 32 should be spaced approximately at 90 cm centers along the longitudinal extension of the anchor means 22.

When the structure is in use, condensation fluids 38 are formed on the lower side of the sheet material 20 and will accumulate above the upper surface 40 of the anchor means 22, and they will overflow and pass down the inner side surface 26. Due to natural unevenness of said timber anchor means 22 the line of contact of the corner 42 to the gutter means 18 does not provide a fluid barrier, so subsequently these condensation fluids 38 will flow to the lower portion of gutter means 18.

FIG. 3a shows an embodiment similar to that of FIG. 3, similar numbers being used to designate similar parts. A screw 44 is used to attach the anchor means 22 to the upper leg of the clamping member 32. Consequently, the corner 42 is spaced from the gutter means 18 and an unobstructed passage is available to drain condensation fluids 38 down the fluid receiving upper portion 34 of gutter means 18.

Figure 4:
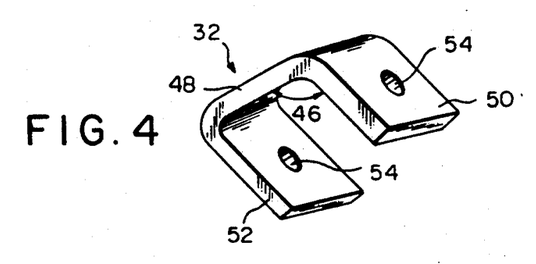
FIG. 4 is a perspective view of the clamping member shown in FIG. 3.

FIG. 4 shows in detail the clamping member 32 which serves to affix the anchor means 22 adjacent to the upper portion 34 of gutter means 18. The clamping member 32 has an inverted U-shaped section, but the internal angle 46 between the base 48 of the U and the upper leg 50 is greater than 90 degrees, the upper leg 50 being substantially parallel to the lower leg 52. Preferably, apertures 54 are provided to allow passage to fasteners. The advantage of this shape becomes apparent when an anchor means of trapezoidal cross-section is used, whereby the runoff of condensation fluids 38 onto the gutter means 18 is facilitated.

Figure 5:
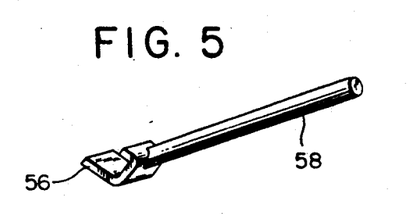
FIG. 5 is a perspective view of a tool useful for the insertion of the anchor means and for tensioning of the roof sheeting.

The tool shown in FIG. 5 is useful for the tensioning of the roof sheeting 20 and for the subsequent insertion of the anchor means 22 into the clamping members 32. A jaw section 56 is provided with an opening slightly wider than the thickness of the anchor means 22. A long handle 58 rigidly attached to the jaw section 56 makes possible the wrenching and subsequent insertion of an anchor means 22 into the clamping members 32, thereby tensioning the sheet material 20. Engagement of the jaw section is preferably at a position adjacent to a clamping member 32, and the tool is disengaged after the anchor means 22 is reinserted in the clamping member 32. The nail 36 shown in FIG. 3 and the screw 44 shown in FIG. 3a are, of course, inserted only on completion of this tensioning operation.

Figure 6A:
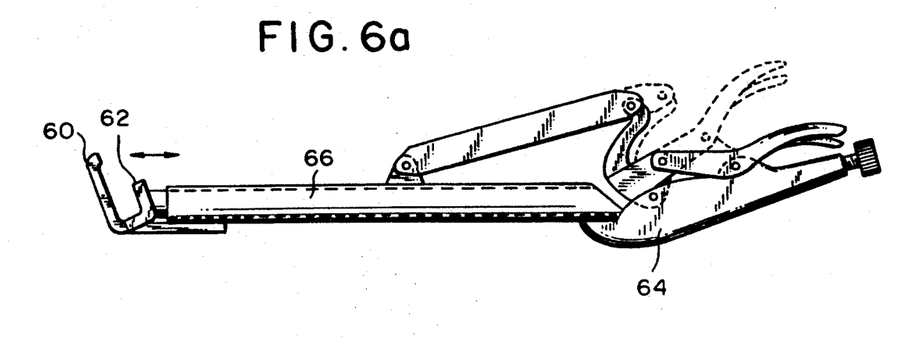
FIG. 6a shows a tool useful for removal from the structure of an anchor means.
Figure 6B:
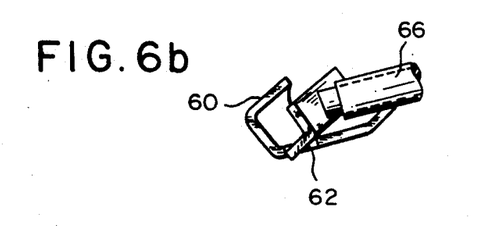
FIG. 6b is a perspective view of the jaws of this tool.

FIGS. 6a and 6b show a tool useful for removal from the clamping member 32 of an anchor means 22 following prior removal of nails 36 and screws 44, if such had been inserted. An outer jaw 60 and an inner jaw 62 are mounted for sliding movement towards and away from each other and, after engaging an anchor means 22, may be used to push out the latter from the open ends of the U of the clamping members 32. As shown in FIG. 3, the clamping members 22 remain attached to the gutter means 18. The jaws' gripping action is hand-operated by means of a toggle plier 64 through a long rod-in-tube 66, providing convenient reach to a person standing on ground level. The anchor means 22 may then be unwound from old sheet material 20 and replacement new sheet material 20 assembled thereon.

Figures 7, 8, 9:
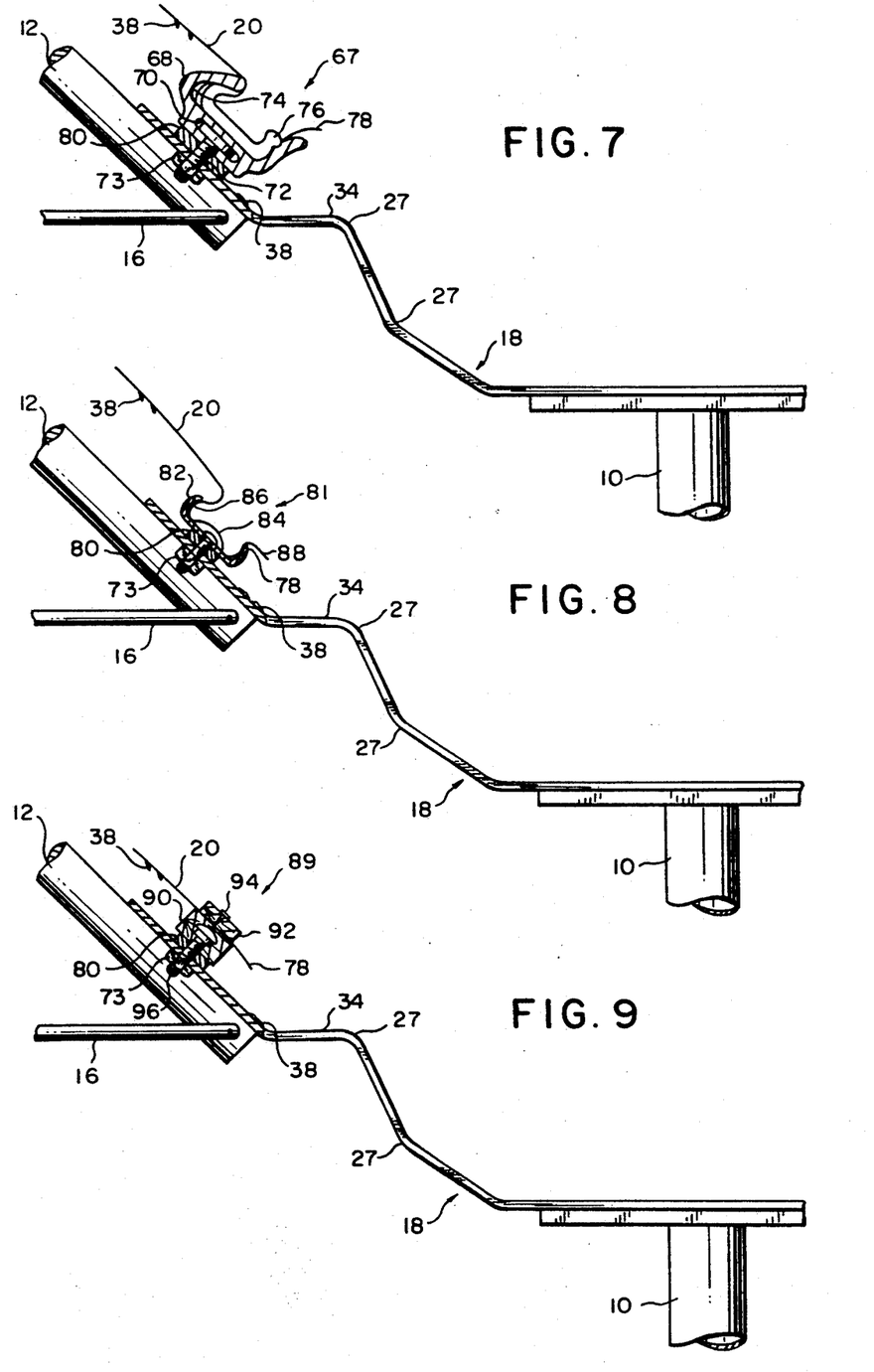
FIGS. 7, 8 and 9 are end views of three further embodiments of the anchor means.

FIG. 7 shows an anchor means 67 comprising a shaped aluminum alloy extrusion 68 provided on one side with a first hollow section 70, shaped to receive the head of a fastener 72 which is provided with a nut 73. On its opposing side, the extrusion 68 is provided with a second hollow section 74, shaped to allow entry to the sheeting material 20 and also to a clamping element 76, which may conveniently be formed from a second aluminum alloy extrusion. The extrusion 68 is so shaped that when assembled, a tensile force applied to the lower end 78 of the sheeting material 20 will dislodge the clamping element 76, thus providing a convenient method of removing worn-out sheeting material 20; but a tensile force applied to the upper portion of the sheeting material 20 will be resisted by the extrusion 68 without dislodging the clamping element 76. Spacer washers 80 are used at spaced intervals at the points where the extrusion 68 is attached to the gutter means 18, so an unobstructed passage remains at locations between the spacer washers 80, and condensation fluids 38 are therefore free to flow from the underside of the sheeting material 20, over the upper part of the extrusion 68 and towards the center of the gutter means 18.

FIG. 8 shows an anchor means 81, comprising a rolled sheet metal shaped profile section 82, which may be made of galvanized mild steel. The head of a fastener 84 projects into the hollow section 86, and the clamping element 88 is shaped to allow room for the fastener head. In other respects, this embodiment is similar to the embodiment described with regard to FIG. 7, but shows advantages in lower costs and slower corrosion rates, due to the metal being used being identical to the metal used for the gutter means 18.

FIG. 9 shows an embodiment of an anchor means 89 made of a wooden strip 90 provided with a wooden clamping element 92 attached thereto by nails 94, thereby gripping the sheet material 20. The wooden strip 90 is held by screws 96 in spaced relationship to gutter means 18 by means of spaced-apart spacer washers 80 for draining condensation fluids 38 below the wooden strip 90. Before replacing or retensioning the sheeting material 20, it is necessary to pry off the clamping element 92, an operation requiring only a simple screwdriver. The advantage of the anchor means 89 lies in the low material cost and ready availability of the wooden strips.

Figures 10, 11:
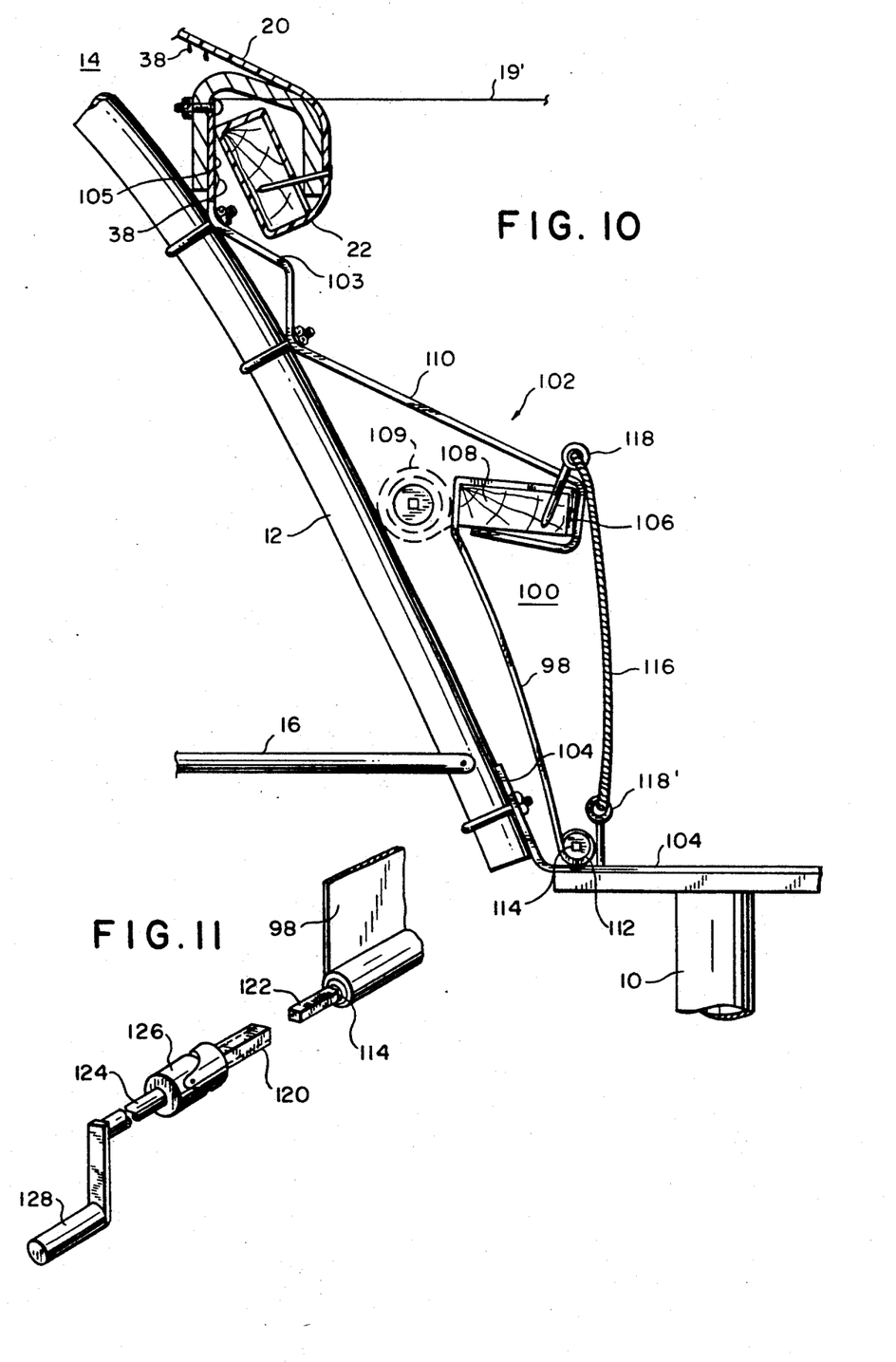
FIG. 10 is an end view of an additional embodiment provided with upper gutter means and a ventilation aperture.
FIG. 11 is a perspective view of a tool useful for rolling-up the lower sheet material shown in FIG. 10.

There is seen in FIG. 10 an embodiment provided with rollable retractable lower sheet material 98 usable for the opening and closing of a ventilation aperture 100. Upper gutter means 102 are provided additionally to lower gutter means 104, both being associated with the roof members 12 and defining therebetween the ventilation aperture 100. The sheeting material 20 covers only the upper portion of the roof span 14, and is held tensioned by an upper anchor means 22 described with reference to FIG. 3, and is affixed adjacent to an inner surface 105 of the upper gutter means 102.

Condensation fluids 38 dripping from the underside of the flexible sheet material 20 within delimited space 19' defined by inner side surface 105 and the opposite side surface (not shown) overflow the upper anchor means 22 and flow down a fluid receiving surface 103 of the upper gutter means 102 and subsequently cascade onto the lower gutter means 104. The upper longitudinal edge 106 of the lower sheet material 98 is affixed to a lower anchor means 108, the latter being supported by the upper gutter means 102, and being affixed adjacent to an inner surface 110 thereof. The lower edge 112 of the lower sheet material 98 is rolled on a mandrel 114. At the start of a growing season, the ventilation aperture 100 may be closed by unrolling the major portion of the lower sheet material 98 from the mandrel 114, which will then rest on the lower gutter means 104. The lower sheet material 98 is protected against excessive vibrational movement due to wind forces by a rope 116 suspended between eyelets 118, 118'. To open the ventilation aperture 100, the mandrel 114 is revolved, thus rolling-up the lower sheet material 98. It is to be noted that the mandrel 114 is free to move vertically and will be pulled upwards during the rolling-up operation, because the upper longitudinal edge 106 is affixed to the lower anchor means 108.

Typically at the end of a growing season, or even during a growing season if horticultural considerations so indicate, the lower sheet material 98 will be fully rolled up as shown at numeral 109, and will be shielded from the elements by the upper gutter means 102.

FIG. 11 shows a tool useful for rolling-up the lower sheet material 98 shown in FIG. 10. A square hollow section 120 of the tool is engagable with a projection 122 of the mandrel 114. A shaft 124 and an universal joint 126 combine to allow operation of the handle 128, while the operator remains at ground level holding the shaft 124 in one hand and the handle 128 in the other. As the lower sheet material 98 is wound up, and the mandrel 114 rises to a higher level, the square hollow section 120 of the tool will also rise. However, the handle 128 will still be conveniently operable from ground level, the universal joint 126 allowing the axis of the square hollow section 120 to remain while the shaft 124 takes up an angle sloped from the horizontal.

Figure 12:
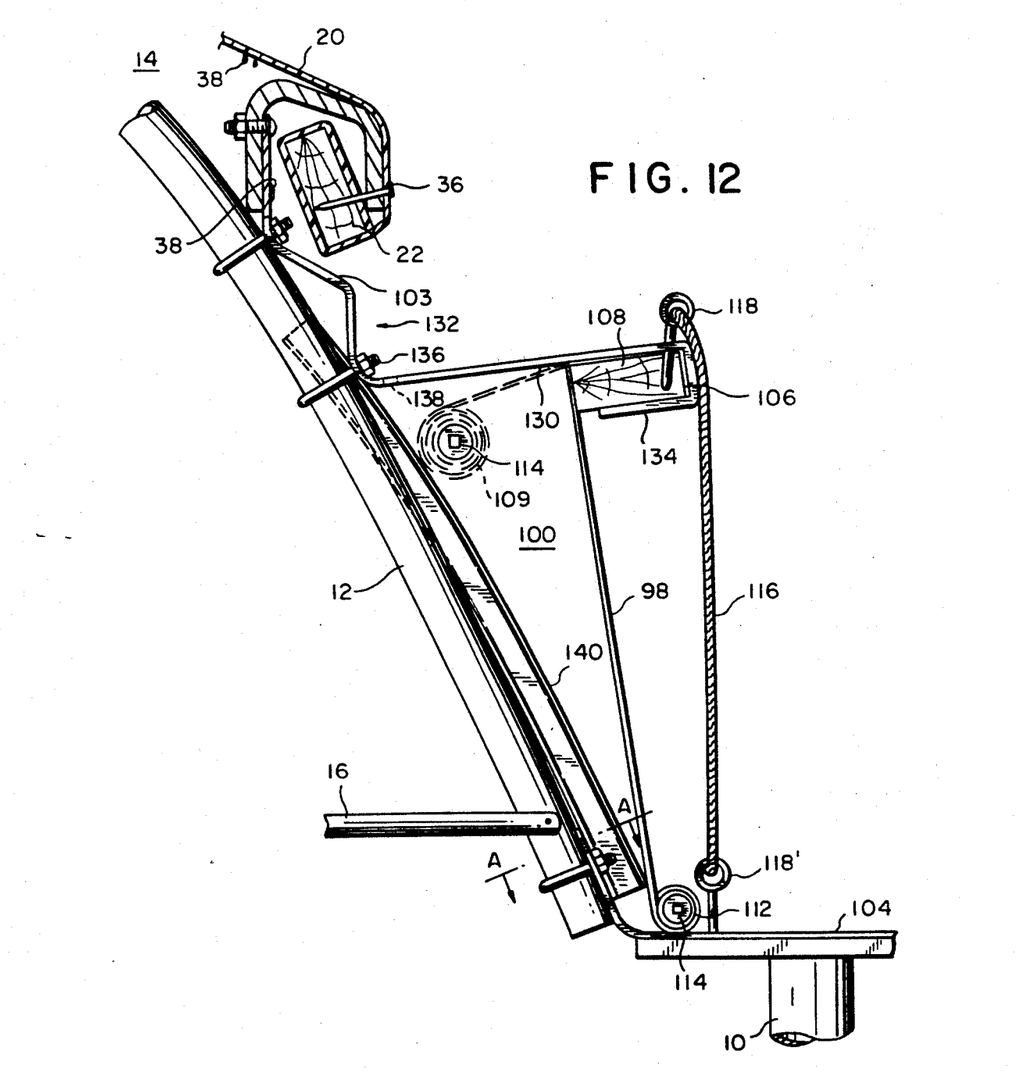
FIG. 12 is a second embodiment of the upper gutter means shown in FIG. 10.

FIG. 12 shows a second embodiment of the upper gutter means. A lower face 130 of an upper gutter element 132 terminates in a retention pocket 134, which is positioned below the lower face 130 and is configured for the insertion therein of the lower anchor means 108. The lower face 130 of upper gutter element 132 is sloped in a direction causing condensation fluids 38, as well as rainwater above the lower face 130, to flow away from the retention pocket 134 in the direction of attachment locations 136 of the upper gutter element 132 to the roof member 12. Drainage apertures 138 are provided at spaced-apart longitudinal locations adjacent to the attachment locations 136, and drainage channels 140 are positioned to accept fluids including condensation fluids 38 which pass through the drainage apertures 138 for transfer to the lower gutter means 104.

Figure 13:
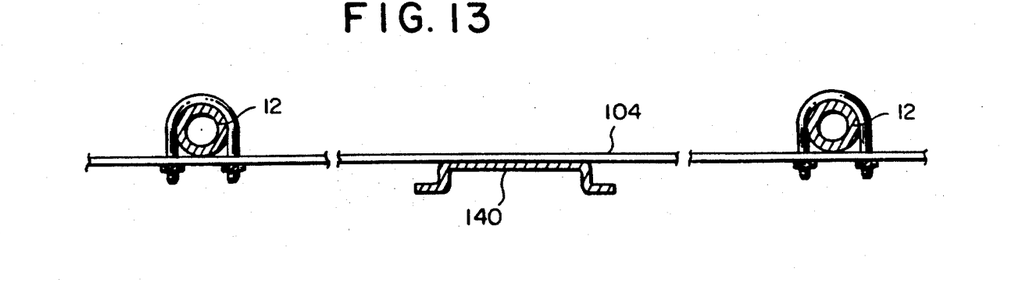
FIG. 13 is a cross-section taken at AA of FIG. 12.

The drainage channels 140 furthermore serve to provide support to the rolled-up lower sheet material 109 and also serve to provide additional support to the upper gutter element 132 to which they are attached. As shown in FIG. 13, preferably one drainage channel 140 is positioned halfway between each pair of roof members 12, thus providing effective drainage and a strong structure.

It will be evident to those skilled in the art that the invention is not limited to the details of the foregoing illustrated embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A plastic-covered, gutter-connected sheltering horticultural structure essentially constructed of a framework and flexible cover sheet material, said sheltering horticultural structure comprising:

a plurality of gutters (18) each having a bottom wall and two side walls forming a concave channel along a length of each of said plurality of gutters;

said each of said plurality of gutters (18) being parallel to each other and supported above ground by a plurality of spaced posts (10);

each of a plurality of arched roof trusses (12, 16) connected at their ends between one of said two side walls of a consecutive pair of said plurality of gutters (18); at least one anchor means joined to each of said plurality of gutters (18) for detachably engaging longitudinal edges of said flexible covering sheet material and maintaining said flexible covering sheet material in a tensioned state over said plurality of roof trusses (12, 16);

said at least one anchor means being located over and within said concave channel;

a plurality of fastening means spaced at intervals along a length of said each of said plurality of gutters (18) for engaging and maintaining said one of said two side walls and said anchor means spaced apart to provide unobstructed passages between said anchor means and said one of said two side walls;

wherein condensation fluids generated within said structure travel down an underside of said flexible covering sheet material, over said anchor means, through said unobstructed passages into said plurality of gutters (18); and fluid precipitation generated exterior to said structure falls on said flexible covering sheet material and travels down directly into said plurality of gutters (18).

2. The sheltering horticultural structure as claimed in claim 1, wherein said anchor means comprises:

a shaped aluminum alloy extrusion having a first hollow cross-section on a first side to receive a head of a fastener;

said shaped aluminum alloy extrusion having a second hollow cross-section on a second side opposite said first side to allow entry of such flexible covering sheet material;

a resilient clamping element having a C-shaped cross-section holding said flexible covering sheet material engaged in said second hollow cross-section;

lower edge means on said shaped aluminum alloy extrusion formed to engage said clamping element for permitting release of said resilient clamping element from said second hollow cross-section when a tensile force is applied to a lower end of said flexible covering sheet material; and upper edge means on said shaped aluminum alloy extrusion formed to engage said clamping element for resisting release of said resilient clamping element from said second hollow cross-section when a tensile force is applied to an upper portion of said flexible covering sheet material.

3. The sheltering horticultural structure as claimed in claim 1, wherein said anchor means comprises:

a rolled sheet-metal shaped profile section having a hollow cross-section to allow entry of said flexible covering sheet material;

a resilient clamping element having a C-shaped cross-section holding said flexible covering sheet material engaged in said hollow cross-section;

lower edge means on said rolled sheet-metal shaped profile formed to engage said clamping element for permitting release of said resilient clamping element from said hollow cross-section when a tensile force is applied to a lower end of said flexible covering sheet material; and upper edge means on said rolled sheet-metal shaped profile formed to engage said clamping element for resisting release of said resilient clamping element from said hollow cross-section when a tensile force is applied to an upper portion of said flexible covering sheet material.

* * * * *